March 31, 1959  A. E. PETERSON  2,880,011
TOGGLE MEMBER
Filed July 27, 1956  2 Sheets-Sheet 2
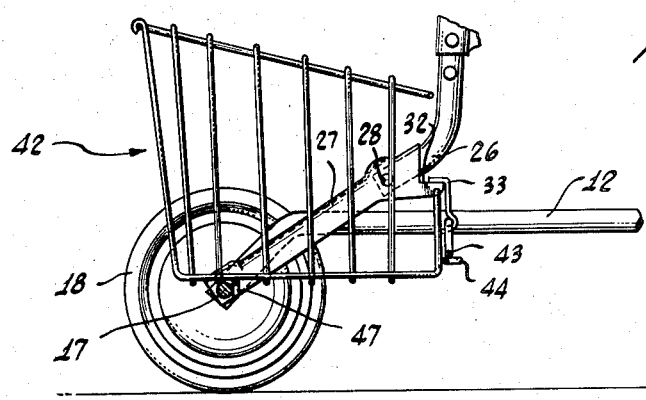
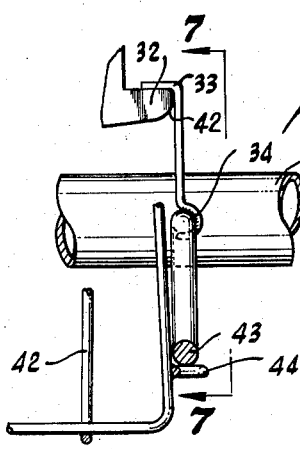
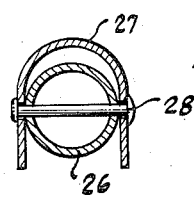
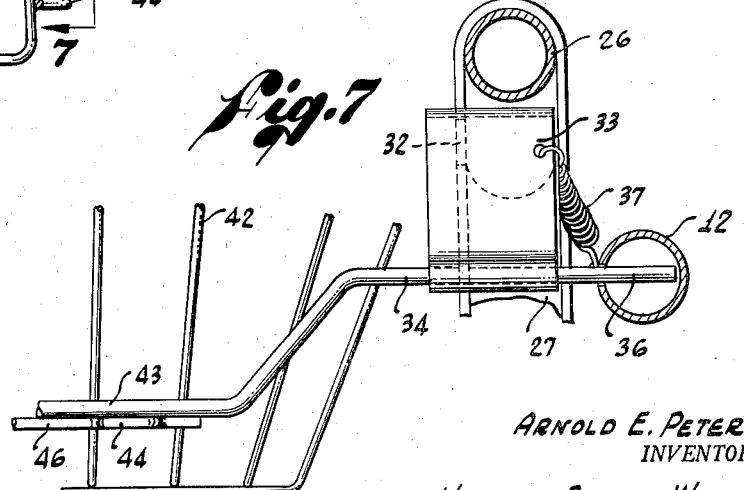
ARNOLD E. PETERSON
INVENTOR.
HUEBNER, BEEHLER, WORREL&HERZIG
ATTORNEYS
By Warren T. Jessup

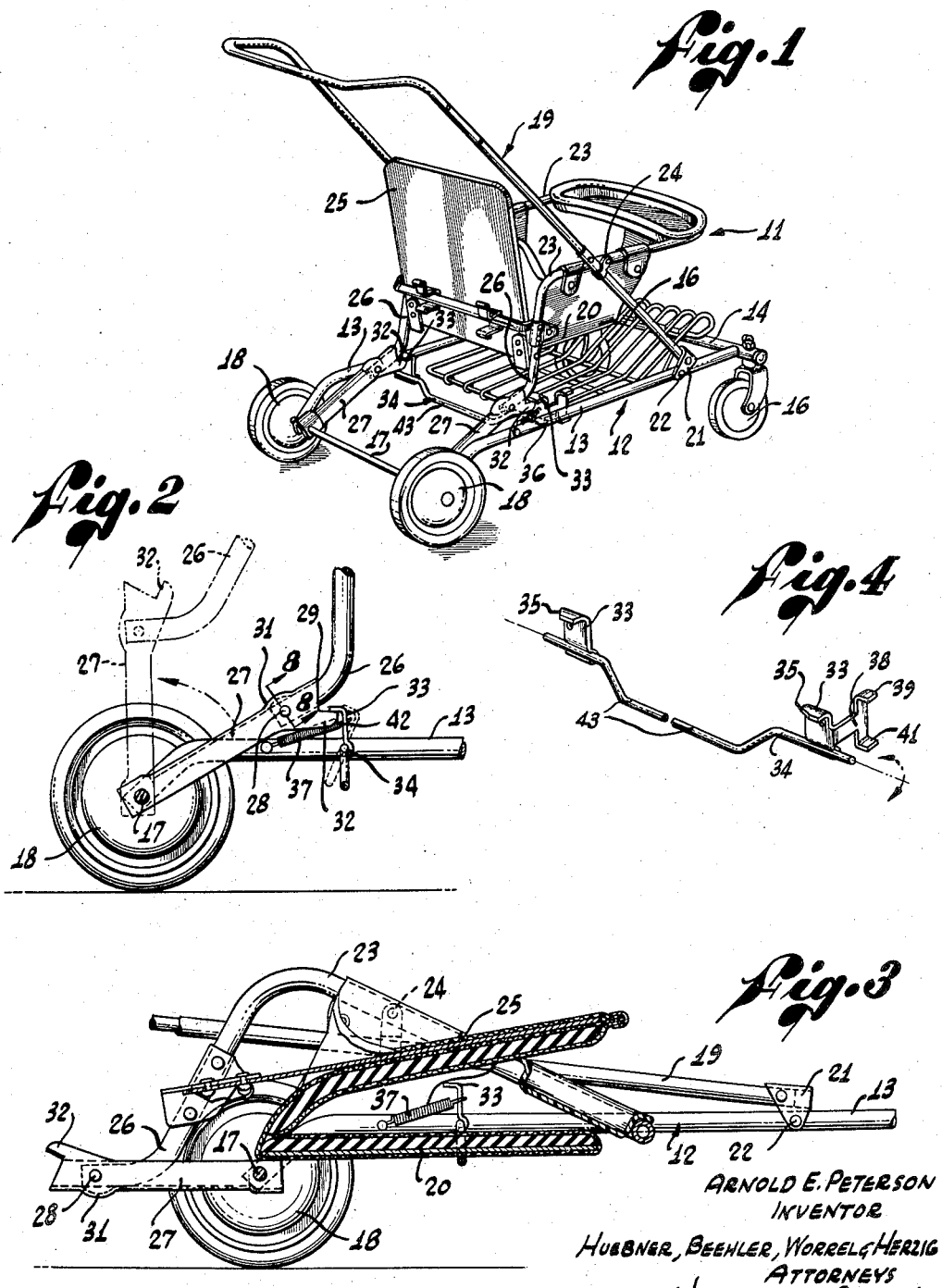

United States Patent Office 2,880,011
Patented Mar. 31, 1959

2,880,011

TOGGLE MEMBER

Arnold E. Peterson, Glendale, Calif., assignor to A. E. Peterson Mfg. Co., Los Angeles, Calif., a corporation of California Application July 27, 1956, Serial No. 600,495

4 Claims. (Cl. 280—36)

This invention relates to toggle members, and more particularly to toggle members such as are used in foldable or collapsible baby strollers.

It is an object of this invention to provide an improved toggle.

It is another object of this invention to provide simplified latching means for a toggle.

It is a further object of this invention to provide an improved toggle for a foldable or collapsible frame structure, such as a foldable stroller.

It is another object of this invention to provide a simplified and improved latch for the toggle of a collapsible vehicle such as a stroller.

It is a further object of this invention to provide simplified means for locking a toggle latch firmly in position to absolutely prevent accidental breaking or collapse of the toggle.

It is another object of this invention to provide a carrying basket for a stroller vehicle which, when in position, positively locks the stroller against accidental folding or collapsing.

In accordance with these and other objects which will become apparent hereinafter, a preferred form of the present invention will now be described with reference to the accompanying drawings wherein:

Fig. 1 is a perspective view of a foldable or collapsible stroller vehicle embodying the improved toggle and latch of the present invention;

Fig. 2 is a fragmentary side elevation of the rear portion of the stroller showing the improved toggle;

Fig. 3 is a fragmentary longitudinal section showing the stroller and toggle in collapsed or unfolded position;

Fig. 4 is a perspective view showing the latch shaft and latch member of the present invention;

Fig. 5 is a fragmentary longitudinal section showing a carrying basket in place, positively locking the toggle latch against accidental operation;

Fig. 6 is a fragmentary detail showing the locking action of the basket of Fig. 5;

Fig. 7 is a section taken on line 7—7 in Fig. 6 and,

Fig. 8 is a fragmentary detail section taken on line 8—8 in Fig. 2.

Referring to the drawings, 11 designates a collapsible frame structure such as a foldable stroller embodying the toggle of the present invention. The stroller frame structure 11 includes a base frame 12 composed of a pair of parallel, longitudinal, tubelike members 13 spanned at the front of the vehicle by a cross member 14. A pair of front wheels 16 are swivelly mounted at the ends of the respective cross member 14, and at the rear the frame 12 is spanned by an axle 17 passing through transverse bores in the respective ends of the members 13. Rear wheels 18 are mounted to the respective ends of the axle 17.

Extending upwardly from the front of the frame 12 is an inclined handle frame 19. The bottom ends of the frame 19 are pivoted to the base frame 12 by means of saddles 21 which are riveted to the respective ends of the handle frame 19, and extend over and are pivoted to the frame 12 by rivet pins 22. An arm rest member 23 is pivotally mounted at 24 to the handle frame 19 and extends downwardly at the rear thereof, as shown at 26, and thence is bent so as to be directed generally towards the axle 17.

A seat 20 is suspended from the forward portion of the arm rest frame 23 and a back 25 is pivotally mounted to the downwardly extending portion of the arm rest frame.

The two parallel rear ends 26 of the arm rest frame 23 are linked to the base frame 12 by a pair of elongate toggle members 27, the bottom ends of which are pivoted to and around the axle 17 and are thus pivotally mounted to the rear of the base frame members 13. The toggle members 27 are U-shaped in cross section, as shown in Fig. 8, and their upper forward ends rest over and around the ends 26 of the arm rest frame.

The toggle members 27 are substantially identical and the description applied to one applies equally to the other with specific exceptions possibly noted hereinafter. Toggle member 27 nests over end 26 of arm rest frame 27, as shown in Fig. 8, and is pivoted thereto by a pivot pin in the form of a rivet 28. Rivet 28 passes through the rod-like end 26 of the arm rest frame, as near to the end as possible while still retaining necessary structural strength. The pin 28 is spaced from the end of the toggle member 27, so that when the stroller is in unfolded position, as shown in Fig. 2, the arm rest member 26 engages the inside of the toggle member at 29, and thus forms a stop or limit to restrain the toggle against further pivoting or unfolding, and the members 27 and 26 are in alignment at the toggle point. In order to accommodate swinging of the end of the member 26 within the U-shaped member 27, the latter is embossed outwardly as shown at 31 to give pivoting clearance.

Extending forwardly from an edge of the U-section toggle member 27 is a lip 32. Engageable over the lip 32, in the erect or unfolded position of the toggle and stroller, is a latch member 33, mounted as by welding to a latch shaft 34, which transversely spans the base frame 12 and is pivoted at each end in the respective longitudinal members, as shown at 36. There is a pair of latch members 33 welded near the respective ends of the latch shaft 34. Tension springs 37 hooked to the latch members 33 bias the members into latched position over the lips 32.

The right hand latch member 33 is provided with an integral forwardly extending portion 38 (Fig. 4) having an upper tab 39 which extends over the top of the frame member 13 and a lower tab 41 which extends beneath the frame member 13. The tabs 39 and 41 serve as stops limiting oscillation of the shaft 34. Thus the stop 39 abuts the frame member 13 to prevent the latches 33 from being retracted too far and thereby possibly distorting the springs 37; while the stop member 41 holds the latches 33 in position to be engaged automatically over the lips 32.

To effect such automatic engagement, the lower and forward portion of the lip 32 is formed as a cam surface shown at 42, so that as the toggle is brought into erect or unfolded position, the latch members 33 are automatically cammed back by the surface 42 against the basis of the spring, until they snap inwardly over the lip 32. Thus it is unnecessary for the user to actuate the latches as the stroller is erected, such actuation being necessary only when it is desired to collapse the stroller. The tab 39 forms a ready means for manually retracting the latches 33 when the stroller is to be collapsed.

The left hand corner of each latch 33 is beveled as shown at 35 to clear the frame member 26 and permit full engagement of the latch 33 over the lip 32.

A package carrying, wire basket 42 is provided which may be selectively mounted to the stroller when desired. In accordance with the present invention, the basket 42 is so designed that when it is installed on the stroller, it positively locks the latch shaft 34 against rotation, thereby insuring against accidental retraction of the latches 33 with consequent possible undesired collapse of the stroller. To this end, the latch shaft 34 is provided with a depressed or offset portion 43, and the mounting of the basket 42 is so arranged that the offset portion 43 of the shaft bears against the basket 42 when in position. Thus the presence of the basket 42 inhibits or prevents the shaft 34 from turning, thereby locking the latch members 33 in latched position.

To effectuate such mounting of the basket 42 a pair of tabs 44 are formed in an auxiliary wire member 46 which is welded to the forward face of the basket 42, with the tabs 44 extending forwardly thereof as shown in Fig. 6. A similar wire member having downwardly extending tabs 47 (Fig. 5) is welded across the bottom of the basket.

The basket 42 is mounted to the stroller by engaging the forward tabs 44 under the latch shaft 34, in this case the offset portion 43 thereof, and then engaging the tabs 47 forwardly over the axle 17. The parts are so shaped and proportioned that the basket must be forced inward slightly to engage the tabs 47 over the axle 17. This firmly holds the basket in the position shown in Fig. 5 and prevents the tabs 44 and 47 from accidentally slipping out from the respective shafts 43 and 17. At the same time, the basket is held firmly in position, so that only a lifting action on the rear of the basket 42 can disengage the basket, and such action is extremely unlikely except when it is deliberately applied for the express purpose of removing the basket.

As best seen in Fig. 6, the presence of the basket 42, bearing as it does against the offset portion 43 of the shaft 34, positively prevents or inhibits the offset portion from being moved to the rear and thus prevents the shaft 34 from rotating clockwise (Fig. 6). Thus, the latches 33 are positively held in engagement over the lips 32 and must remain in this position until the basket is removed. The basket 42 thus does double duty as a package receptacle and as a lock for preventing inadvertent collapsing of the stroller.

While the instant invention has been shown and described herein in what is conceived to be the most practical and preferred embodiment, it is recognized that departures may be made therefrom within the scope of the invention which is therefore not to be limited to the details disclosed herein, but is to be accorded the full scope of the claims.

What is claimed is:

1. In a foldable frame structure for a baby stroller vehicle or the like, a base frame, an inclined handle frame pivotally mounted upon and extending upwardly from said base frame, an arm rest member pivotally connected to said handle frame, a toggle member pivotally mounted to said base frame, the upper end of said toggle member having a cross section in the form of a U nesting around the lower end of said arm rest member, pivot means pivoting said lower end of said arm rest member to the upper end of said toggle member, whereby the toggle action of said toggle member upon unfolding of said structure is limited by engagement of said arm rest member with the inside of said toggle member, said toggle member including a lip extending forwardly from an edge of one of the parallel arms of the U, and latch means pivoted to said base frame and selectively engageable over said lip to hold the toggle in unfolded position.

2. In a foldable frame structure for a baby stroller vehicle or the like, a base frame, an inclined handle frame pivotally mounted upon and extending upwardly from said base frame, an arm rest member pivotally connected to said handle frame, a toggle member pivotally mounted to said base frame, the upper end of said toggle member having a cross section in the form of a U nesting around the lower end of said arm rest member, pivot means pivoting said lower end of said arm rest member to the upper end of said toggle member, whereby the toggle action of said toggle member upon unfolding of said structure is limited by engagement of said arm rest member with the inside of said toggle member, said toggle member including a lip extending therefrom, a latch shaft pivotally mounted to said base frame and disposed transversely thereof, a latch member secured to said latch shaft and engageable over said lip to latch said toggle member in erect position, and spring means for biasing said shaft and latch member to latched position.

3. In a foldable frame structure for a baby stroller vehicle or the like; a base frame; an inclined handle frame pivotally mounted on and extending upwardly from said base frame; an arm rest member pivotally connected to said handle frame; a pair of toggle members pivotaly mounted at their respective lower ends to said base frame, the respective upper ends of said toggle members each having a cross section in the form of a U nesting around the lower ends of the corresponding arm rest members and being connected thereto at points spaced from the ends of the respective toggle members, so that when said structure is in erect position the respective ends of said arm rest members nest within the ends of said toggle members and stop the toggle from further erection; each said toggle member including a lip extending forwardly therefrom; a latch shaft pivotally mounted to said base frame and disposed transversely thereof; a pair of latch members secured to said latch shaft and engageable over said lips to latch said toggle members in erect position; spring means biasing said shaft and latch members to latched position; and a basket mountable to the structure at the rear thereof; said shaft having an offset portion bearing against said basket, said basket preventing turning of shaft and thereby locking said latch members in latched position.

4. Structure in accordance with claim 3 including an axle extending transversely across said base frame at the rear thereof, said basket having tab means at the front thereof engageable under said latch shaft and tab means on the bottom thereof engageable forwardly of said axle to hold said basket in position at the rear of said structure.

References Cited in the file of this patent

UNITED STATES PATENTS

| | | |
|---|---|---|
| 1,652,102 | Elmer | Dec. 6, 1927 |
| 1,785,343 | Gilbert | Dec. 16, 1930 |
| 1,854,981 | Caverly | Apr. 19, 1932 |
| 2,200,889 | Mahr | May 14, 1940 |
| 2,566,459 | McCoy | Sept. 4, 1951 |
| 2,668,061 | Kuda | Feb. 2, 1954 |
| 2,678,219 | Goodman | May 11, 1954 |
| 2,728,580 | Preisler | Dec. 27, 1955 |
| 2,786,692 | Timpson | Mar. 26, 1957 |

FOREIGN PATENTS

| | | |
|---|---|---|
| 488,567 | Canada | Dec. 2, 1952 |
| 643,651 | France | May 21, 1928 |
| B-20,597 | Germany | May 3, 1956 |